May 14, 1929.  W. E. MARTOIS  1,712,927
MECHANICAL MOVEMENT
Filed May 12, 1928

INVENTOR.
Waldo E. Martois
BY
Robt. D. Pearson
ATTORNEY.

Patented May 14, 1929.

1,712,927

UNITED STATES PATENT OFFICE.

WALDO E. MARTOIS, OF LYNWOOD, CALIFORNIA.

MECHANICAL MOVEMENT.

Application filed May 12, 1928. Serial No. 277,203.

This invention relates to a mechanical movement particularly intended for pumping jacks but which may be found to be applicable to various other machines.

An object of the invention is to provide means for producing a long uniform reciprocatory movement of the polish rods of oil well pumps, or for pumps employed in other situations, and in general to impart a long, straight line reciprocation to any carriage or other element to which it may be found desirable to apply my newly invented mechanical movement.

In the illustrated embodiment of the invention a chain and sprocket wheel gearing is employed, there being a main stationary sprocket wheel and an auxiliary sprocket wheel, the latter wheel performing both a gyratory movement around the main gear wheel, and a rotary movement with respect to the arm upon which it is mounted such movement being controlled by sprocket chain which operatively connects said wheels; but it is to be understood that the relative rotation of said wheel may be produced and controlled by other means, which possibly may suggest themselves to the skilled workman, without necessarily departing from the scope of the invention as defined in the claims.

Other objects and advantages may hereinafter appear.

Referring to the accompanying drawings which illustrate what is at present considered a preferred embodiment of the invention, Figure 1 is front view of the device showing the same arranged to operate the polish rod of an oil well pump.

Figure 1:
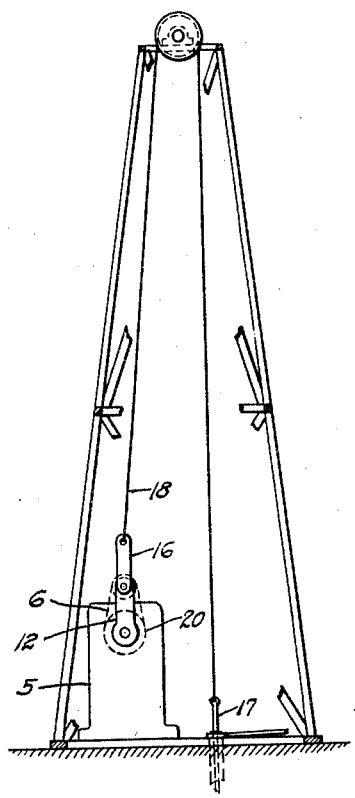
Figure 2:
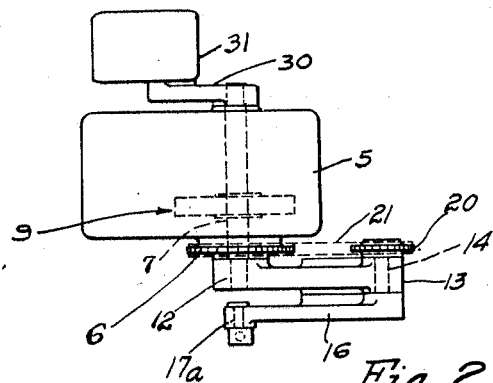
Figure 2 is plan view of the device itself.

Referring in detail to the drawings, to the gear casing 5 is secured a stationary sprocket wheel 6 through the axis of which extends a rotatable shaft 7. Said shaft 7 is driven by the motor 8 through gearing 9 within casing 5.

Figure 3:
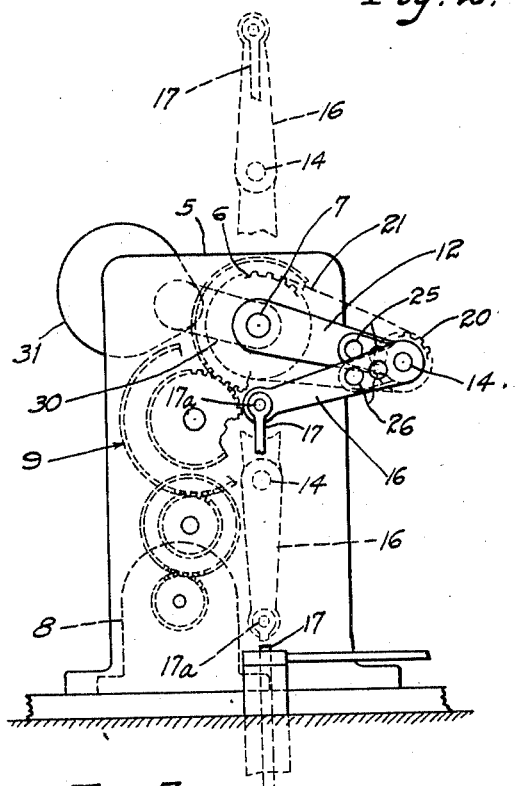
Figure 3 is an elevation thereof.

Said shaft 7 projects beyond the outer face of sprocket wheel 6 and the projecting part of said shaft has secured thereto a main crank arm 12. Said main crank arm 12 carries an outer bearing 13 through which extends a stub shaft 14 when the parts are assembled as shown in Figure 3. To the outer end of said shaft 14 is attached the auxiliary crank arm 16 the free end of which is, by pivot 17$^a$, connected to the polish rod 17 or other reciprocated element, in Figure 1 the cable 18.

To the inner end of stub shaft 14 is secured the auxiliary sprocket wheel 20. The sprocket chain 21 operatively connects said sprocket wheels 6 and 20.

Spaced holes 25 are provided through the main crank arm 12, and corresponding holes 26 through the auxiliary crank arm 16 all these holes being adapted to form a fit around shaft 14. This construction, therefore, makes it possible to shorten both said crank arms, so far as their operation is concerned, so that the distance between the pivotal connections of one arm may always be kept the same as that of the other, to obtain variable strokes of said crank arms and maintain the same straight line reciprocation of the element pivoted to the free end of arm 16.

By making the sprocket wheel 6 of approximately twice the diameter of the sprocket wheel 20 and then applying the sprocket chain 21 in the proper manner, the crank arms 12 and 16 may be so positioned with relation to each other that the device, as viewed in Figure 3, will, during operation, constantly maintain the main shaft 7 and the rod pivot 17$^a$ in vertical alinement with each other.

The maintenance of straight line reciprocation of the rod 17 is dependent not only upon the relative sizes of the sprocket wheels and lengths of arms 12 and 16, but also upon the relative positions of said crank arms at the time the sprocket chain is applied to the sprocket wheels. When all these mechanical elements are proportioned and arranged as illustrated in the drawings, the rod 17 or other element pivoted to the free end of crank arm 16, will be moved directly back and forth through the same plane as that occupied by the axis of the main sprocket wheel 6.

The shaft 7 is extended completely through the motor casing 5 where it is provided with a crank arm 30 to the free end of which is attached a counterweight 31. Cranks 12 and 30 extend in diametrically opposite directions from shaft 7 in order that said counterweight 31 may assist in lifting polish rod 17 during the upstroke of crank 12.

I claim:

1. A mechanical movement comprising a stationary sprocket wheel, a rotatable shaft extending axially through said wheel, a main radial arm fixed to said shaft, a rotary sprocket wheel carried by said arm to be gyrated around said shaft, a sprocket chain adapted to be lengthened and shortened operatively connecting said wheels, an auxiliary arm carried by and projecting radially from said rotary sprocket wheel, means to adjust the pivot of said connection between said arms to shorten correspondingly the operative movements of said arms, said pivot forming a bearing element for said rotary sprocket wheel, and a reciprocatory element pivotally secured to the last recited arm.

2. A mechanical movement comprising a stationary sprocket wheel, a rotatable shaft extending axially through said wheel, a main radial arm fixed to said shaft, a rotary sprocket wheel carried by and pivoted to said arm to be gyrated around said shaft, a sprocket chain adapted to be lengthened and shortened operatively connecting said wheels, an auxiliary arm carried by and projecting radially from said rotary sprocket wheel, each of said arms being provided with a series of spaced bearing apertures, the apertures of one arm being spaced correspondingly to those of the other arm to cooperate therewith, the pivot of said connection between said arms being adapted to fit various cooperating apertures of said series, said pivot forming a bearing element for said rotary sprocket wheel, and a reciprocatory element pivotally secured to the last recited arm.

In testimony whereof I hereunto affix my signature.

WALDO E. MARTOIS.